United States Patent [19]

Curiel et al.

[11] 4,344,289

[45] Aug. 17, 1982

[54] TWO-STAGE SUPERCHARGING APPARATUS

[75] Inventors: Georg Curiel, Wettingen; Moustafa M. Naguib, Nussbaumen, both of Switzerland

[73] Assignee: BBC Brown, Boveri & Company, Ltd., Baden, Switzerland

[21] Appl. No.: 120,482

[22] Filed: Feb. 11, 1980

[30] Foreign Application Priority Data

Feb. 19, 1979 [CH] Switzerland .................. 1609/79

[51] Int. Cl.³ ............................................. F02B 37/00
[52] U.S. Cl. ..................................... 60/612; 417/407
[58] Field of Search .................. 60/612, 606; 417/407, 417/408, 409

[56] References Cited

U.S. PATENT DOCUMENTS

| | | | |
|---|---|---|---|
| 2,375,006 | 5/1945 | Larrecq | 60/612 X |
| 3,257,797 | 6/1966 | Lieberherr | 60/612 X |
| 4,032,262 | 6/1977 | Zehnder | 60/612 X |

*Primary Examiner*—Michael Koczo, Jr.
*Attorney, Agent, or Firm*—Burns, Doane, Swecker & Mathis

[57] ABSTRACT

A two-stage exhaust-driven supercharger aggregate is disclosed which comprises a low-pressure supercharger and a high-pressure supercharger. Each of the two superchargers is provided with a compressor driven by a respective turbine. Each of these superchargers is arranged on a separate shaft. In order to provide sufficient space for auxiliary components such as supercharger-air coolers, a bypass system and the like, and to obtain one compact structural unit, the pressure ratio of the low-pressure compressor is made greater than the pressure ratio of the high-pressure compressor by at least 40%. In this way, the geometrical exterior dimensions of the high-pressure supercharger becomes substantially smaller than the dimensions of the low-pressure supercharger. The shaft of the high-pressure supercharger is arranged such that it is parallel to, and offset laterally relative to the shaft of the low-pressure supercharger. Due to the smaller size of the high-pressure supercharger at least a portion of the auxiliary components are arranged in a radial direction next to the high-pressure supercharger without extending beyond an enveloping profile of the low-pressure supercharger. By the present invention, a very compact exhaust-driven supercharger aggregate is formed.

13 Claims, 5 Drawing Figures

TWO-STAGE SUPERCHARGING APPARATUS

BACKGROUND AND SUMMARY OF THE INVENTION

The present invention relates to a two-stage supercharging method and apparatus for the supercharging of an internal combustion engine.

A known two-stage exhaust-driven supercharger assembly, disclosed for example in the Swiss Pat. No. 595 941 and the published German patent application No. 27 52 988, have the disadvantage that the exterior dimensions of the low-pressure and the high-pressure superchargers are practically identical. The low-pressure and the high-pressure superchargers have an identical pressure ratio within the low-pressure and the high-pressure compressors. Since the two supercharger shafts are located within one plane, it becomes impossible to install any necessary auxiliary components, such as a bypass valve, a combustion chamber, an air charge intercooler or the like, next to the low-pressure and the high-pressure superchargers in such a manner that a compact two-stage exhaust-driven supercharger assembly will result.

It is an object of the present invention to provide a supercharging method and apparatus which will make possible the construction of a truly compact two-stage exhaust-driven supercharger aggregate.

The present invention accomplishes this object and others by providing a two-stage, exhaust-driven supercharger aggregate wherein the expansion of the exhaust gas is accomplished first within at least one high-pressure turbine and then within one low-pressure turbine. In addition, the compression of the fresh air to be fed into the internal combustion engine is accomplished first in a low-pressure compressor and then in at least one high-pressure compressor.

In a preferred embodiment, the pressure ratio of the low-pressure compressor is at least 3:1 and preferably at least 4:1, and the pressure ratio of the high-pressure compressor is no more than 3:1 and preferably no more than 2:1. Also, it is preferred that the total pressure ratio of the exhaust-driven supercharger aggregate is at least 6:1 and preferably at least 8:1.

The present invention also provides for cooling the fresh air to be fed into the internal combustion engine after it emerges from the high-pressure compressor. Preferably the fresh air is also cooled after emerging from the low-pressure compressor.

In order to influence the operating characteristic within the compressor performance graph, to improve the behavior under partial load, and to influence operations under full and/or partial load as well as to meet special operating characteristics of the internal combustion engine to be supercharged, it is preferred to feed a portion of the compressed supercharger air emerging from the high-pressure compressor into the intake of the high-pressure turbine by way of a bypass and control device. The portion of the compressed supercharger air is mixed with the exhaust gas from the internal combustion engine. The mixture of exhaust gas and the supercharger air is then heated and fed into the intake of the high-pressure turbine. The heating is preferably accomplished in a combustion chamber arranged prior to the inlet of the high-pressure turbine.

In a preferred embodiment of the apparatus of the present invention, the front end of the low-pressure supercharger is formed by the exterior parts of the low-pressure supercharger which are in the most outward position in an axial direction. In order to conserve space when charging a V-engine it is preferred to provide the exhaust-driven supercharger aggregate with at least two high-pressure superchargers which are connected with the low-pressure supercharger. The axes of the two high-pressure superchargers are arranged in an offset manner relative to the axis of the low-pressure supercharger and at least approximately symmetrically to each other.

In this arrangement, it is preferred to arrange the turbine and/or the compressor of the high-pressure and/or the low-pressure supercharger in multi-stage form.

In addition, the exhaust gas to be fed into the intake of the high-pressure turbine may be heated in a combustion chamber arrangement prior to the admixture with a portion of the compressed supercharger air emerging from the high-pressure compressor.

BRIEF DESCRIPTION OF THE DRAWINGS

Preferred embodiments of the two-stage supercharging method and apparatus according to the present invention will be described with reference to the accompanying drawings wherein like members bear like reference numerals and wherein.

DETAILED DESCRIPTION OF THE PREFERRED EMBODIMENTS

Figure 1:
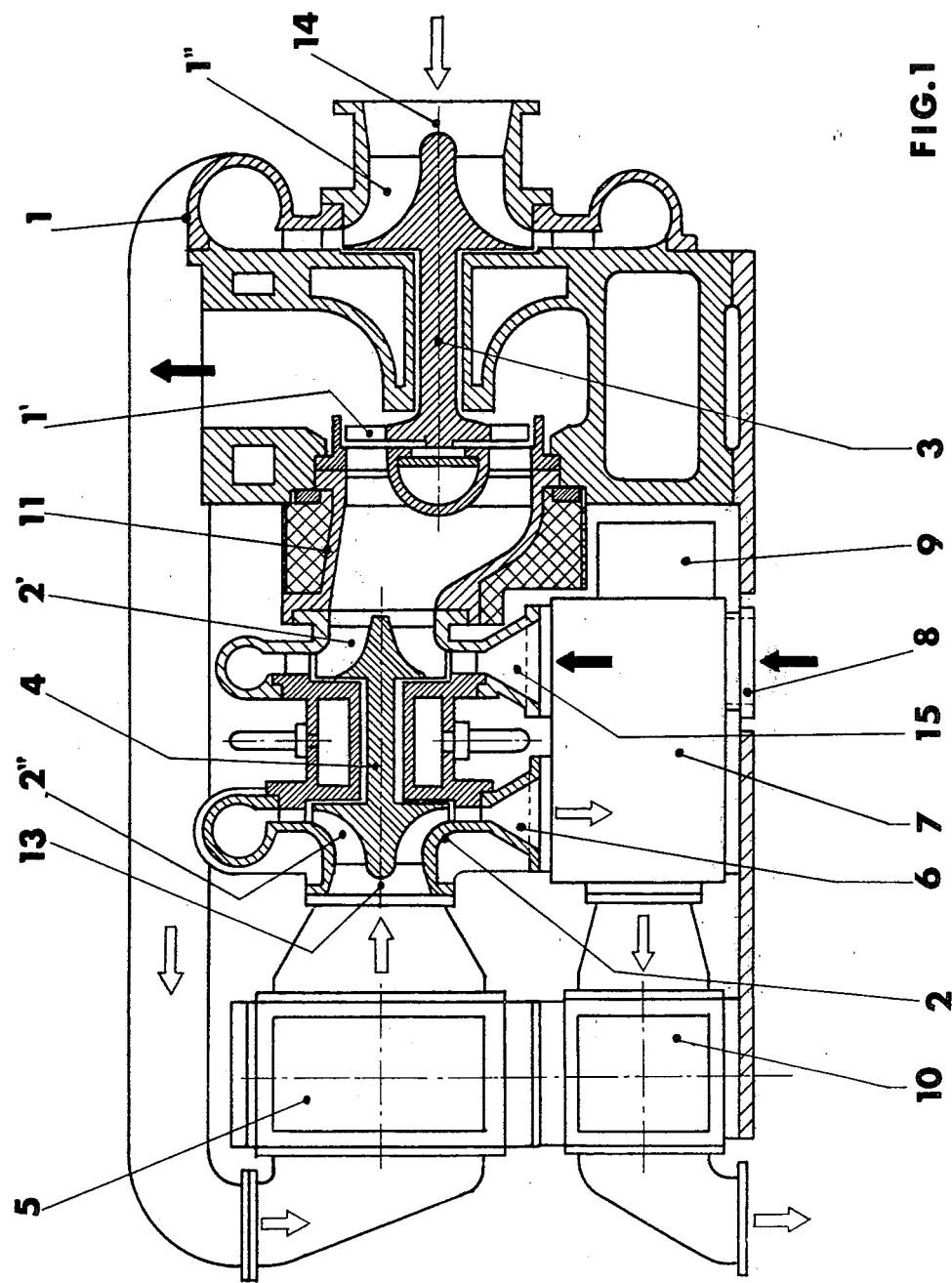
FIG. 1 is a longitudinal cross-sectional view of a first embodiment of an exhaust-driven supercharger aggregate in accordance with the present invention.

With reference to FIG. 1, a two-stage exhaust-driven supercharger aggregate is provided with one low-pressure supercharger 1 and one high-pressure supercharger 2. Each of the two superchargers 1, 2 is provided with a compressor 1", 2" respectively. Each compressor 1", 2" is driven by a turbine 1', 2' respectively and is arranged on a separate shaft 3, 4. The turbine 2' of the high-pressure supercharger 2 is connected in front of the turbine 1' of the low-pressure supercharger 1, viewed in direction of the exhaust gas flow. Between the low-pressure compressor 1" and the high-pressure compressor 2" there is arranged a low-pressure supercharger-air intercooler 5 for cooling the compressed air exiting from the low-pressure compressor 1".

The outlet 6 of the high-pressure compressor 2" leads to a bypass and control valve 7 which admixes one portion of the compressed supercharger air, emerging from the high-pressure compressor 2", with the exhaust gas supplied from the internal combustion engine to the supercharger by way of an exhaust manifold 8. The mixture of exhaust gas and compressed air is heated with the aid of a combustion chamber arrangement 9 and fed into the high-pressure turbine 2', thus attaining a so-called hyperbar supercharge.

The remaining portion of the compressed supercharger air emerging from the high-pressure compressor 2" which is not admixed with the exhaust gas supplied by the exhaust manifold 8 is fed by way of a high-pressure supercharger air cooler 10 into the internal combustion engine which is being supercharged.

The distribution of the total pressure ratio between the high-pressure and the low-pressure superchargers 2 and 1 respectively is arranged in such a manner that the low-pressure supercharger will operate at the highest possible pressure ratio, which pressure ratio is at least 40% greater than the pressure ratio of the high-pressure compressor. A low-pressure compressor of advanced design can readily attain pressure ratios between 4:1 and 5:1.

By providing such a high pressure ratio in the low-pressure supercharger, it is possible to keep the pressure ratio at the high-pressure compressor 2" relatively low, that is, approximately between 2:1 and 3:1. This arrangement results in a high-pressure supercharger having exterior dimensions which are relatively small in comparison with those of the low-pressure compressor. Due to the smaller exterior dimensions of the high-pressure supercharger 2, it is possible to offset the shaft 4 of the high-pressure supercharger 2 laterally and upwardly relative to the shaft 3 of the low-pressure supercharger 1. In this way, sufficient space is provided adjacent the high pressure supercharger 2 for the bypass and control valve system 7 as well as for the combustion chamber 9 without going beyond the three-dimensional profile of the low pressure supercharger 1. The dimensions of the supercharger aggregate are thus determined by the exterior dimensions of the low-pressure supercharger 1.

The low-pressure supercharger air intercooler 5 as well as the high-pressure supercharger air cooler 10 are arranged at the inlet side of the high-pressure supercharger 2 within the three-dimensional profile determined by the exterior dimensions of the low-pressure supercharger. This arrangement results in a fully assembled two-stage exhaust-driven supercharger aggregate which forms a very compact modular unit which ensures an optimum utilization of available space.

The combination of the high-pressure and the low-pressure superchargers 2 and 1 respectively, with none, one, or more of the auxiliary components, forms one compact supercharging unit which can be arranged in any suitable manner in conformity with the particilar engine to be supercharged and the engine's specific requirements.

Figure 2:
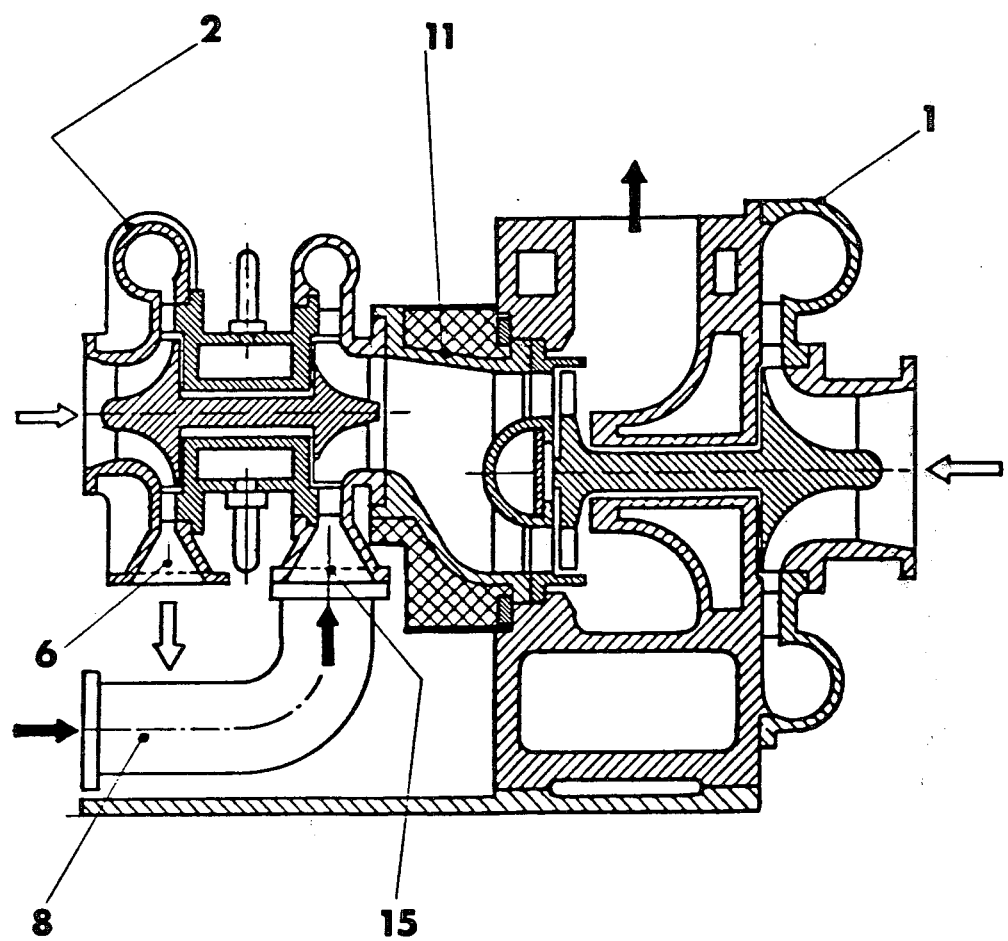
FIG. 2 is a partial longitudinal cross-sectional view of a second embodiment of an exhaust-driven supercharger aggregate.

With reference to FIG. 2, a second embodiment of a two-stage exhaust-driven supercharger aggregate differs from the embodiment illustrated in FIG. 1 in that all of the auxiliary components are not required. The offset of the shaft 4 of the high-pressure supercharger 2 relative to the shaft 3 of the low-pressure supercharger 1 is utilized in this embodiment to provide sufficient space for the exhaust manifold 8. In this way, it is possible to arrange the low-pressure supercharger 1 directly adjacent to the engine to be supercharged since, as a result of the advantageous arrangement of the present invention, there remains sufficient space to locate the exhaust manifold 8 next to the high-pressure supercharger 2. Alternatively, it would also be possible to utilize the space adjacent the high-pressure supercharger for one or two supercharger air coolers in place of the exhaust manifold 8.

Figure 3:
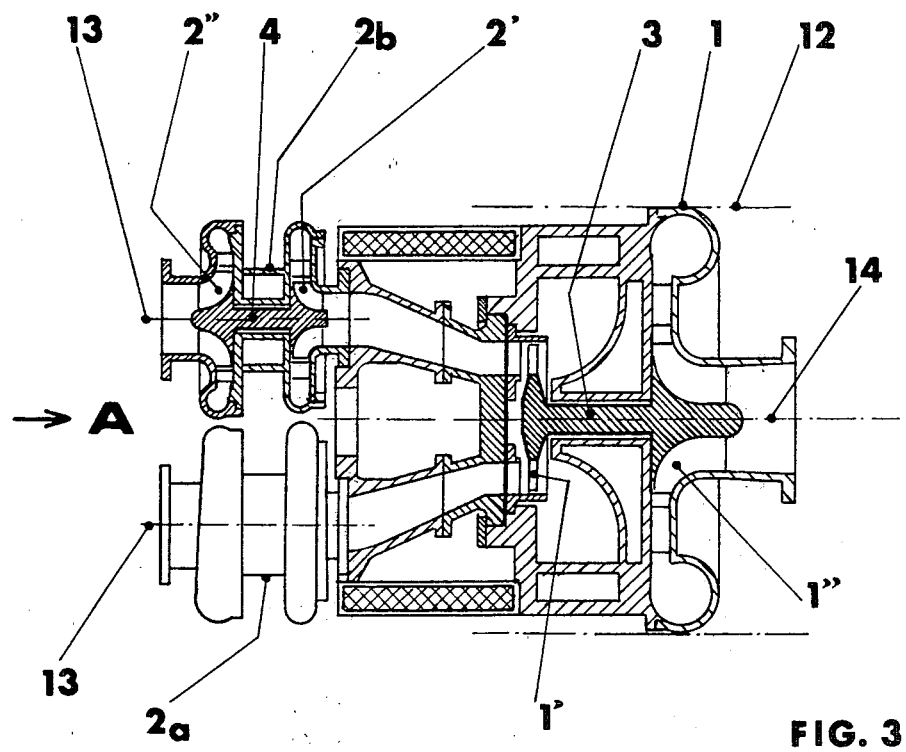
FIG. 3 is a longitudinal cross-sectional view of a third embodiment of an exhaust-driven supercharger aggregate in accordance with the invention taken along the line III—III in FIG. 4.
Figure 4:
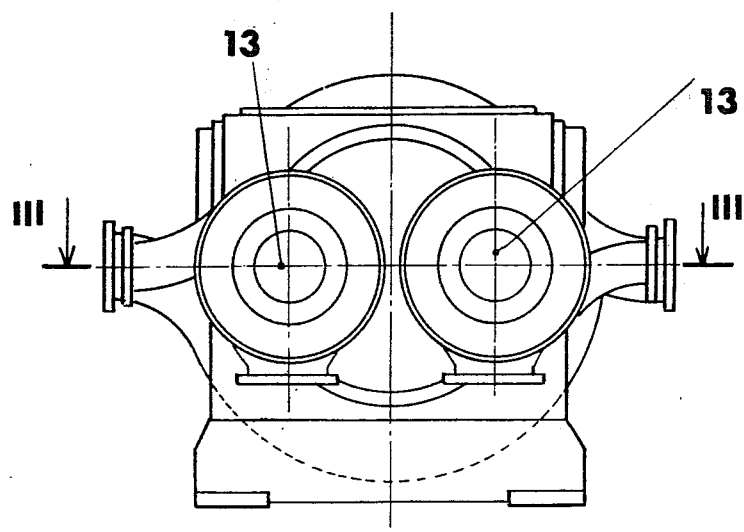
FIG. 4 is a view of the exhaust-driven supercharger aggregate illustrated in FIG. 3 taken in the direction of arrow A.

A further embodiment, illustrated in FIGS. 3 and 4, is particularly suitable for the supercharging of V-engines. The low-pressure supercharger 1 is connected with two relatively small high-pressure superchargers 2a and 2b, with a shaft 4 for each of the two high-pressure superchargers 2a, 2b being offset laterally relative to the shaft 3 of the low-pressure supercharger. The shafts for the two high-pressure superchargers are arranged symmetrically relative to the shaft 3 and to each other.

Figure 5:
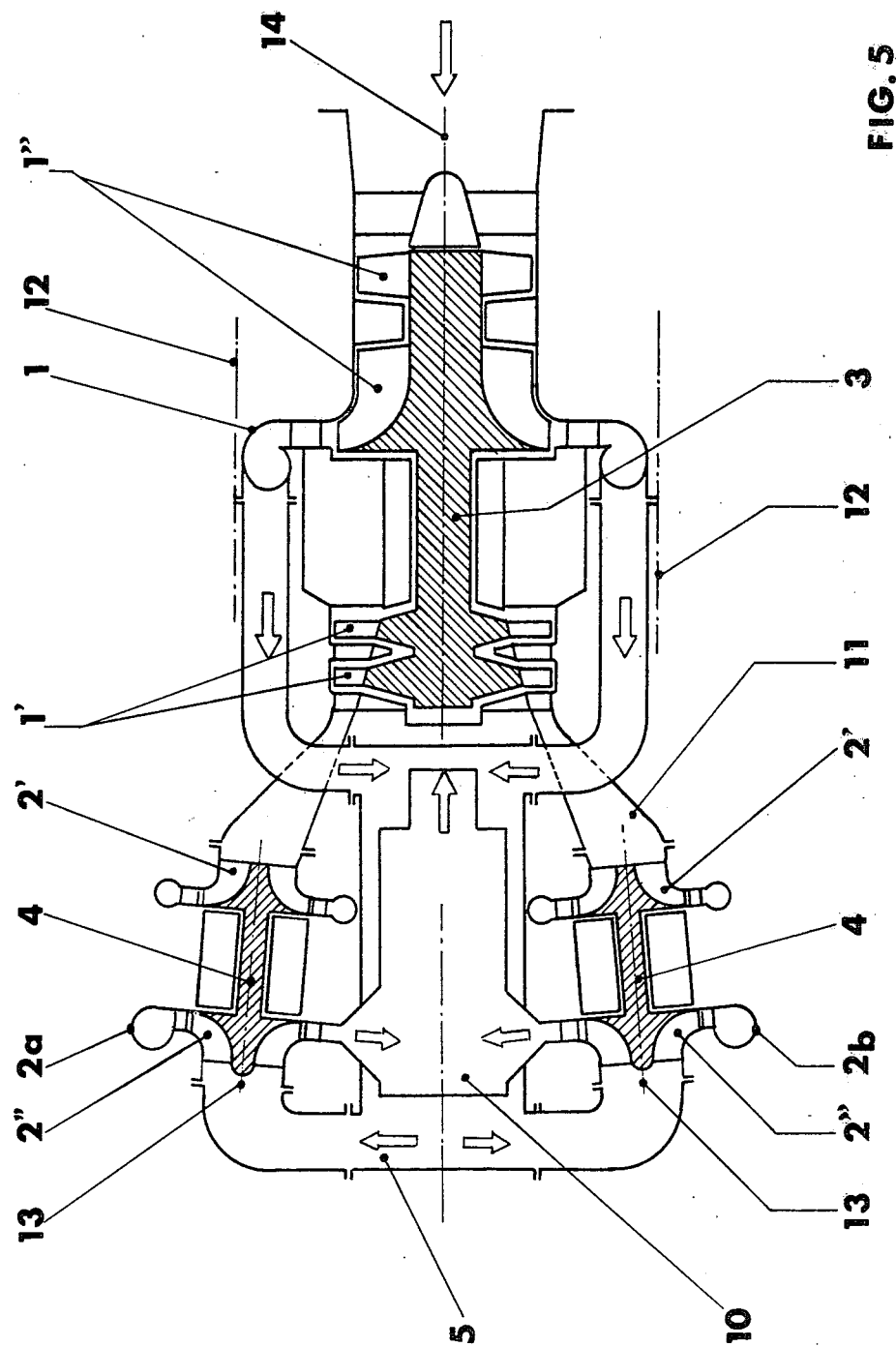
FIG. 5 is a longitudinal cross-sectional view of a fourth embodiment of an exhaust-driven supercharger aggregate according to the present invention.

In the embodiment of FIG. 5, the low-pressure supercharger 1 comprises a two-stage axial/radial compressor 1" and a two-stage axial turbine 1'. The two high-pressure superchargers 2a, 2b are moved away from the center axis of the low-pressure supercharger 1 such that the space between the two high-pressure superchargers 2a, 2b can be utilized for the placement of a low-pressure supercharger air cooler 5 and a high-pressure supercharger air cooler 10, which coolers 5, 10 are combined into one single block. The two high-pressure superchargers 2a and 2b do not extend significantly beyond the enveloping profile 12 of the low-pressure supercharger 1, as viewed within a plane placed through the two shafts of the high-pressure superchargers.

It is apparent that the exhaust-driven supercharger aggregate of the present invention permits the use of any type of turbine or compressor, for example, axial, radial, diagonal, axial/radial, axial diagonal, etc., in single as well as in multi-stage form.

The principles and preferred embodiments of the present invention have been described in the foregoing specification. However, the invention which is intended to be protected is not to be construed as limited to the particular embodiments disclosed. The embodiments are to be regarded as illustrative rather than restrictive. Variations and changes may be made by those skilled in the art without departing from the spirit of the present invention.

What is claimed is:

1. A supercharger for an internal combustion engine comprising:
   a high-pressure compressor and turbine arranged on a first axis, the high-pressure turbine being directly driven by exhaust gas from an internal combustion engine;
   a low-pressure compressor and turbine arranged on a second axis, the low-pressure turbine being driven by exhaust from the high-pressure turbine;
   the low-pressure compressor and turbine has greater exterior dimensions than the high-pressure compressor and turbine; and
   the first axis being arranged radially offset from the second axis such that the exterior dimensions of the high-pressure compressor and turbine will be substantially within an extension of the exterior dimensions of the low-pressure compressor and turbine.

2. The supercharger of claim 1 wherein the pressure ratio of the low-pressure compressor is at least 3:1 and wherein the pressure ratio of the high-pressure compressor is no more than 3:1.

3. The supercharger of claim 1 wherein the pressure ratio of the low-pressure compressor is at least 4:1 and wherein the pressure ratio of the high-pressure compressor is no more than 2:1.

4. The supercharger of claim 2 or 3 wherein the total pressure ratio of the low-pressure and the high-pressure compressor is at least 6:1.

5. The supercharger of claim 2 or 3 wherein the total pressure ratio of the low-pressure and the high-pressure compressor is at least 8:1.

6. The supercharger of claim 1, wherein the high-pressure compressor further compresses air from the low-pressure compressor for use as intake air for the engine and further comprising valve means for bypassing a portion of the intake air leaving the high-pressure compressor to the intake of the high-pressure turbine to mix with the exhaust gas from the internal combustion engine.

7. The supercharger of claim 6 further comprising heating means for heating the mixture of exhaust gas and the portion of the intake air prior to entry into the high-pressure turbine.

8. The supercharger of claim 1 further comprising first and second cooler means for cooling the outputs from the high-pressure and the low-pressure compressors respectively, said first and second cooler means being arranged within the extension of the exterior dimensions of the low-pressure compressor and turbine.

9. The supercharger of claim 1 or 8 further comprising valve means for bypassing a portion of the output of the high-pressure compressor to an exhaust duct from the engine, which exhaust duct leads to the inlet of the high pressure turbine, wherein the exhaust duct and the valve means are arranged radially offset from the first axis, between the high-pressure compressor outlet and the low-pressure turbine inlet, and within the extension of the exterior dimensions of the low-pressure compressor and turbine.

10. The supercharger of claim 1 further comprising an additional high-pressure compressor and turbine arranged on a third axis, the first and third axes being arranged substantially symmetrically with respect to the second axis and wherein the exterior dimensions of the additional high-pressure compressor and turbine lies substantially within the extension of the exterior dimensions of the low-pressure compressor and turbine.

11. The supercharger of claim 1 wherein the high-pressure compressor is arranged downstream from the low-pressure compressor when viewed in the direction of intake air flow for the internal combustion engine.

12. A supercharger for an internal combustion engine comprising:
   a high-pressure compressor and turbine arranged on a first axis, the high-pressure turbine being directly driven by exhaust gas from an internal combustion engine;
   a low-pressure compressor and turbine arranged on a second axis, the low-pressure turbine being driven by exhaust from the high-pressure turbine;
   the low-pressure compressor and turbine has greater exterior dimensions than the high-pressure compressor and turbine;
   the first axis being arranged radially offset from the second axis such that the exterior dimensions of the high-pressure compressor and turbine wll be substantially within an extension of the exterior dimensions of the low-pressure compressor and turbine viewed in the direction of the second axis; and
   auxiliary components for the supercharger arranged adjacent the high-pressure compressor and turbine, said auxiliary components being within the extension of the exterior dimensions of the low-pressure compressor and turbine.

13. The supercharger of claim 1 or 12, wherein the pressure ratio of the low-pressure compressor is at least 40% greater than the pressure ratio of the high-pressure compressor.

* * * * *